United States Patent
Lau et al.

(10) Patent No.: US 8,648,515 B2
(45) Date of Patent: Feb. 11, 2014

(54) BRUSH DESIGN FOR ELECTRIC MOTOR HAVING COMMUTATOR

(75) Inventors: James Ching Sik Lau, Hong Kong (CN); Duncan Yiu Lung Wong, Hong Kong (CN); Chang Lin Jin, Shenzhen (CN); Yuen Tung Louie, Hong Kong (CN)

(73) Assignee: Johnson Electric S.A., Murten (CH)

( * ) Notice: Subject to any disclaimer, the term of this patent is extended or adjusted under 35 U.S.C. 154(b) by 370 days.

(21) Appl. No.: 12/715,678

(22) Filed: Mar. 2, 2010

(65) Prior Publication Data

US 2010/0225198 A1 Sep. 9, 2010

(30) Foreign Application Priority Data

Mar. 3, 2009 (CN) .......................... 2009 1 0105928

(51) Int. Cl.
*H02K 13/00* (2006.01)
*H02K 13/10* (2006.01)
*H02K 5/14* (2006.01)
*H01R 39/26* (2006.01)

(52) U.S. Cl.
CPC ............... *H02K 13/00* (2013.01); *H02K 13/10* (2013.01); *H02K 5/148* (2013.01); *H01R 39/26* (2013.01)
USPC ........... 310/248; 310/249; 310/251; 310/252; 310/253

(58) Field of Classification Search
CPC ....... H01R 39/26; H02K 13/00; H02K 13/10; H02K 5/148
USPC .......................... 310/248, 249, 251, 252, 253
IPC ............................................. H02K 13/00,13/10
See application file for complete search history.

(56) References Cited

U.S. PATENT DOCUMENTS

| 2,206,366 | A | * | 7/1940 | Redmond | 310/247 |
|---|---|---|---|---|---|
| 4,112,321 | A | * | 9/1978 | Wan | 310/242 |
| 5,019,741 | A | * | 5/1991 | Fukui et al. | 310/239 |
| 5,414,317 | A | * | 5/1995 | Reid et al. | 310/239 |
| 5,495,134 | A | * | 2/1996 | Rosenblum | 310/239 |
| 5,594,290 | A | * | 1/1997 | Shannon et al. | 310/251 |
| 5,780,952 | A | * | 7/1998 | Lau | 310/239 |
| 5,909,077 | A | * | 6/1999 | Bruhn | 310/251 |
| 6,100,617 | A | * | 8/2000 | Carter et al. | 310/90 |
| 2008/0093947 | A1 | * | 4/2008 | Aoyama et al. | 310/197 |
| 2010/0225198 | A1 | * | 9/2010 | Lau et al. | 310/248 |

FOREIGN PATENT DOCUMENTS

| EP | 0081828 | 4/1986 |
|---|---|---|
| KR | 20020074325 A | 9/2002 |

* cited by examiner

*Primary Examiner* — John K Kim
(74) *Attorney, Agent, or Firm* — Muncy, Geissler, Olds & Lowe, PLLC

(57) ABSTRACT

An electric motor has a pair of brushes for transferring power to windings of a wound rotor by making sliding contact with a cylindrical commutator. Each brush has a body with a pair of end surfaces, and a contact surface extending between the end surfaces and configured to slidingly contact a cylindrical circumferential surface of the commutator. The extending direction of the contact surface is inclined relative to the axial direction of the commutator, and the contact surface is V-shaped when viewed in the extending direction thereof.

7 Claims, 5 Drawing Sheets

BRUSH DESIGN FOR ELECTRIC MOTOR HAVING COMMUTATOR

CROSS REFERENCE TO RELATED APPLICATIONS

This non-provisional patent application claims priority under 35 U.S.C. §119(a) from Patent Application No. 200910105928.5 filed in The People's Republic of China on Mar. 3, 2009.

FIELD OF THE INVENTION

This invention relates to electric motors and in particular, to an electric motor having a carbon brush giving improved characteristics to the motor.

BACKGROUND OF THE INVENTION

With respect to direct current motor, low noise is very important. A conventional method of reducing noise is to adhere vibration dampeners on vibration sources. However, this kind of conventional method is complicated and costly.

Furthermore, in some motors, for example motors for window lift applications in vehicles, Hall sensors are needed for counting rotations of the shaft or for calculating the rotation speed of motor, which is complicated and costly.

SUMMARY OF THE INVENTION

Hence there is a desire for an improved brush which is capable of overcoming some or all of the above-mentioned problems.

Accordingly, in one aspect thereof, the present invention provides a brush for making electrical contact with a commutator of an electric motor, the brush comprising: a first end surface; a second end surface opposite the first end surface; and a contact surface extending between the first and second end surfaces and configured to make sliding contact with a cylindrical circumferential surface of the commutator, wherein the extending direction of the contact surface is inclined relative to the axial direction of the commutator, and the contact surface is V-shaped when viewed in the extending direction thereof.

Preferably, the extending direction of the contact surface is inclined relative to the axial direction of the commutator with an angle of 1~60 degree.

Preferably, the inclined angle is between 3 and 10 degrees.

Preferably, the contact surface has a projection forming a portion of the contact surface which has a greater inclination to the axial direction of the commutator than the remainder of the contact surface.

Preferably, the inclined angle of the projection is about 60 degrees.

Preferably, the brush has a pair of grooves formed in opposite surfaces thereof for guiding the brush to the commutator.

According to a second aspect, the present invention provides an electric motor comprising: a rotor comprising a commutator with a cylindrical circumferential surface; a stator; and brush gear comprising at least two brushes, each brush having a contact surface making sliding contact with the surface of the commutator, wherein each contact surface is V-shaped when viewed in a direction parallel to the axis of the rotor and inclined relative to the surface of the commutator in said axial direction such that the initial contact between the contact surface of each brush and the surface of the commutator is a pair of point contacts.

Preferably, the inclined angle is in the range of 1-60 degree.

Preferably, each brush has a pair of grooves formed in opposite surfaces thereof, each brush is supported by a brush holder and each brush holder has a pair of guide pins received in respective grooves.

Preferably, springs resiliently urge the brushes towards the commutator.

According to a further aspect, the present invention also provides an electric motor comprising: a rotor comprising a commutator with a cylindrical circumferential surface; a stator; and brush gear comprising at least two brushes as defined above.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
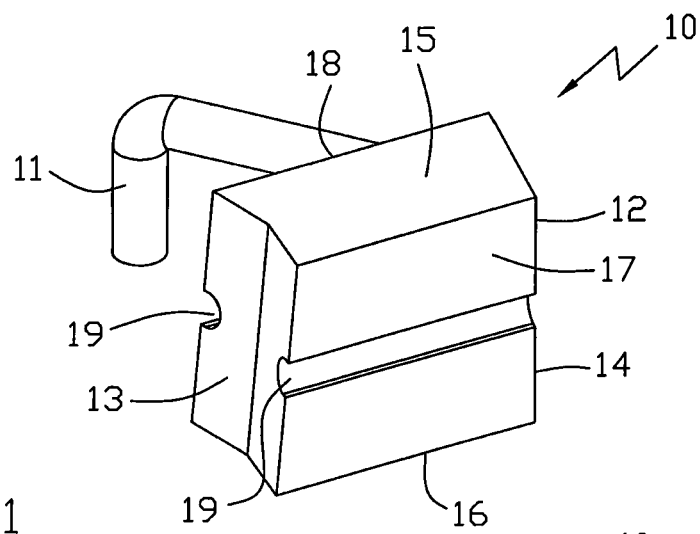
FIG. 1 is an isometric view of a brush in accordance with an embodiment of the present invention.

FIG. 1 is an isometric view of a brush 10 in accordance with the preferred embodiment of the present invention. The brush 10 comprises a body 12 and a shunt 11 extending from the body 12. The body 12 has a cuboid-like configuration with six sides, including a contact surface 13, a base surface 14 opposite the contact surface, a pair of end surfaces 15, 16 and a pair of side surfaces 17, 18. In the present description, the axial, radial and circumferential directions refer to the axial, radial and circumferential directions of the shaft of the motor. The dimensions of the brush are related to the orientation of the brush when fitted to the motor. Thus the length of the brush 10 means the dimension of the brush measured from the contact surface 13 to the base surface 14 i.e. in the radial direction of the motor, the height of the brush 10 means the dimension of the body measured between the end surfaces 15, 16 as these face the axial ends of the motor or the dimension of the brush measured in the axial direction, and the width of the brush 10 means the dimension of the brush measured between the side surfaces 17, 18, i.e. the circumferential direction or at least a direction orthogonal to the axial and radial directions.

The shunt 11 extends from one of the side surfaces 18. The shunt connects the body to a source of electrical power. Usually the shunts are connected to the motor terminals either directly or via chokes, coils or other electrical components. The side surfaces 17, 18 each have a groove 19 which extends from the base surface 14 to the contact surface 13. The grooves form a part of the brush guidance system which will be described in more detail later. The base surface 14 may be orthogonal to the radial direction but is preferably inclined to the radial direction while still being parallel to the motor axis, for better connection with an arm of a spring.

Figure 2:
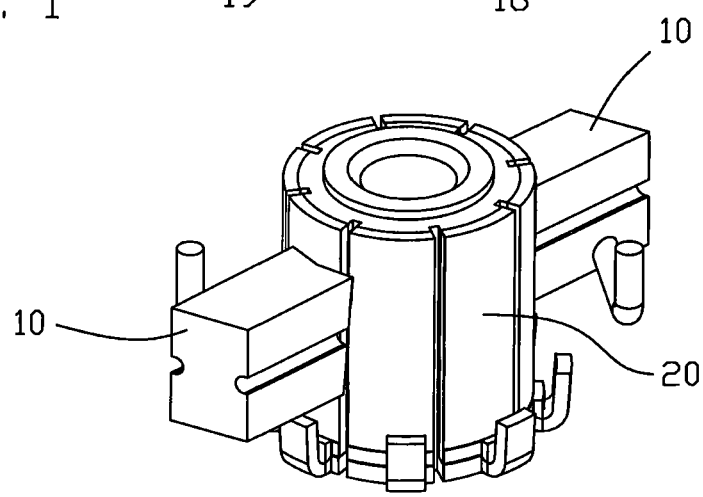
FIG. 2 shows a commutator and a pair of brushes as shown in FIG. 1.
Figure 3:
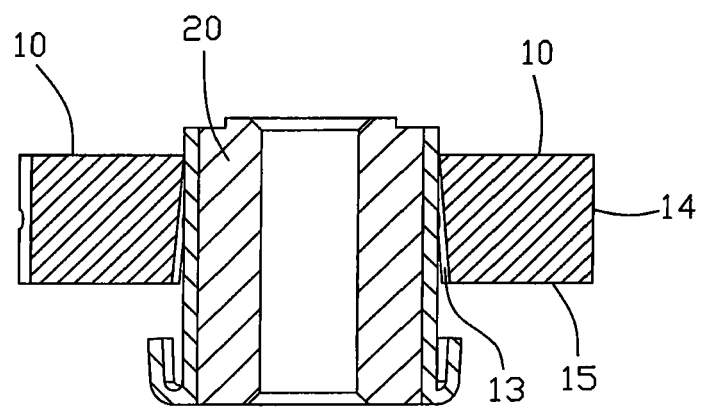
FIG. 3 is a sectional side view of the arrangement of FIG. 2.
Figure 4:
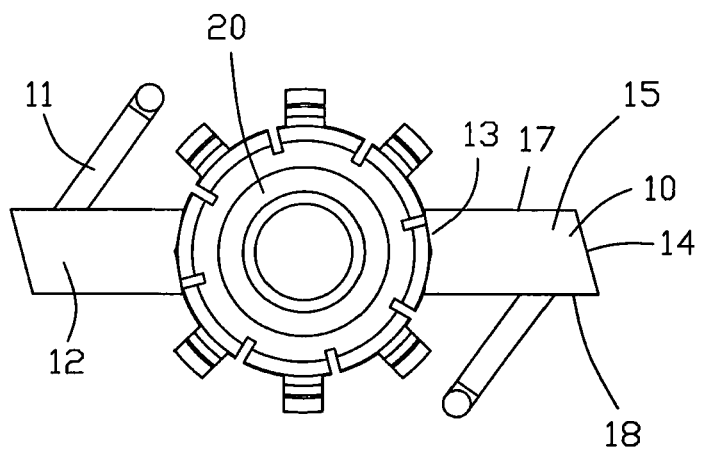
FIG. 4 is a plan view of the arrangement of FIG. 2.

Referring to FIGS. 2 to 4, the contact surface 13 is configured to contact the cylindrical circumferential surface of a commutator 20. The contact surface 13 is V-shaped when viewed in the height direction of the brush 10 (axial direction of the motor), as shown in FIG. 4. That is, in the width direction of the brush 10, the middle portion of the contact surface 13 is concaved relative to opposite side portions of the contact surface 13. The contact surface 13 is inclined backward in the height direction from one axial end surface to the other. That is, the contact surface 13 is inclined relative to the axial direction of the commutator 20. Thus, initially, when contact surface 13 first makes contact with the commutator 20, only two points at opposite sides at one end of the contact surface 13 contact the surface of the commutator 20, which allows the contact surface 13 to easily and readily bed in with the commutator to match the surface of the commutator 20. Preferably, the inclined angle of the contacting surface 13 is in the range of 1 to 60 degree. However, as a steep inclined angle such as 60 degrees will result in rapid wearing of the brush, and as shallow angles take longer to bed in, a preferred optional angle is in the range of 3 to 10 degrees.

Figure 5:
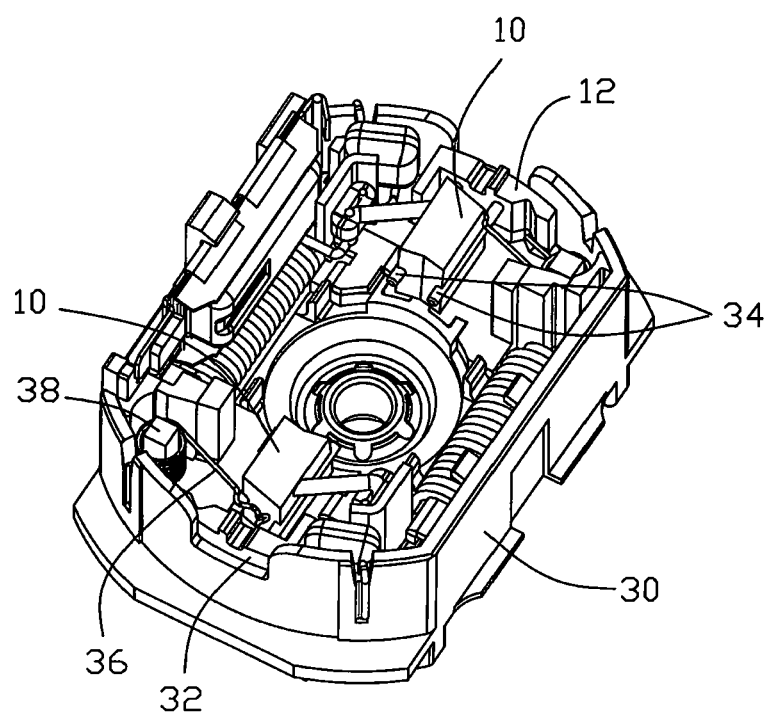
FIG. 5 shows a pair of brushes according to FIG. 1 installed at an end cap of an electric motor.

Referring to FIG. 5, a pair of brushes 10 is installed at brush holders 32 at opposite sides of an end cap 30 of an electric motor. The end cap 30 has a hole at the center thereof, for receiving the shaft of the motor. The commutator 20 is mounted on the shaft and faces the brushes 10. Each brush holder 32 has a pair of guide pins 34 respectively received in the grooves 19 formed in the side surfaces 17, 18 of the corresponding brush 10. Springs 36 are mounted to posts 38 with a free end thereof baring on the base surfaces 14, to urge the brushes 10 towards the commutator 20.

Figure 6:
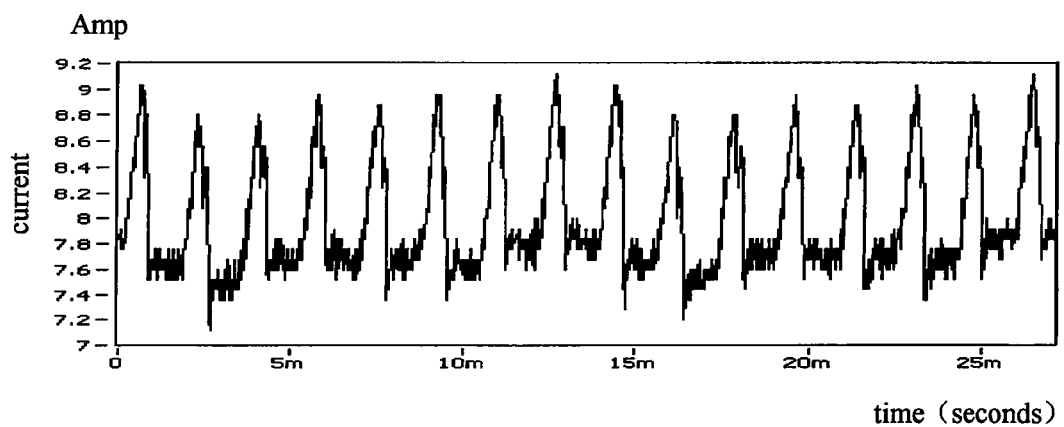
FIG. 6 shows a current waveform of a conventional electric motor.
Figure 7:
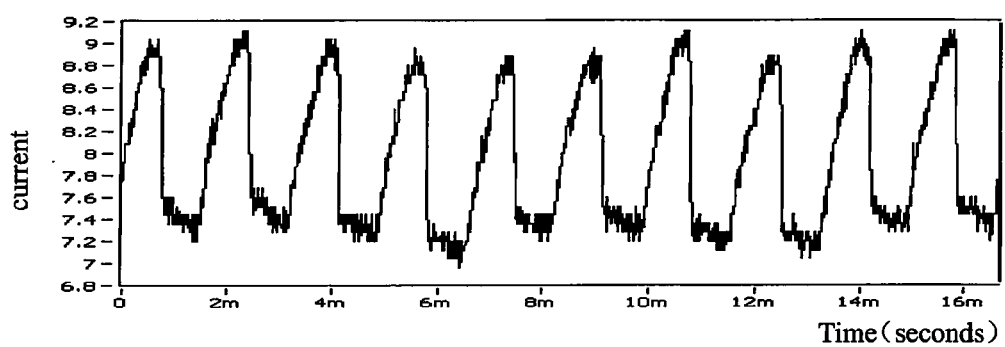
FIG. 7 shows a current waveform of an electric motor using brushes in accordance with one embodiment of the present invention.
Figure 8:
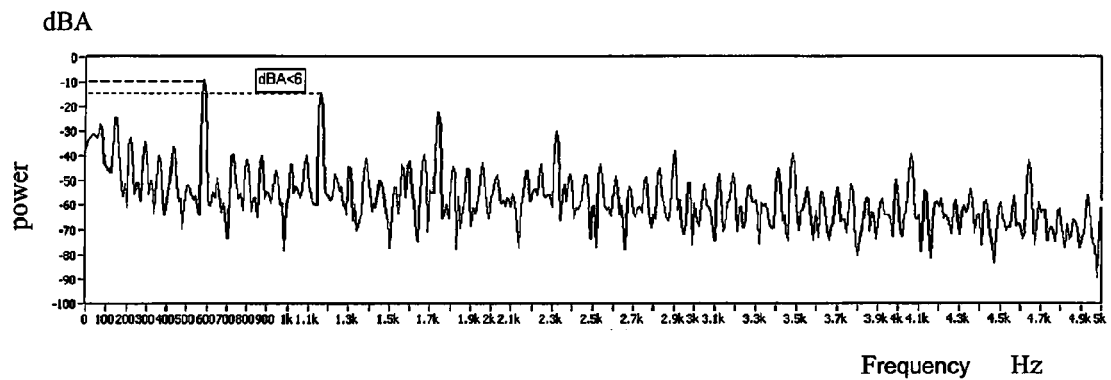
FIG. 8 shows a fast Fourier transform of a current waveform of a conventional electric motor.
Figure 9:
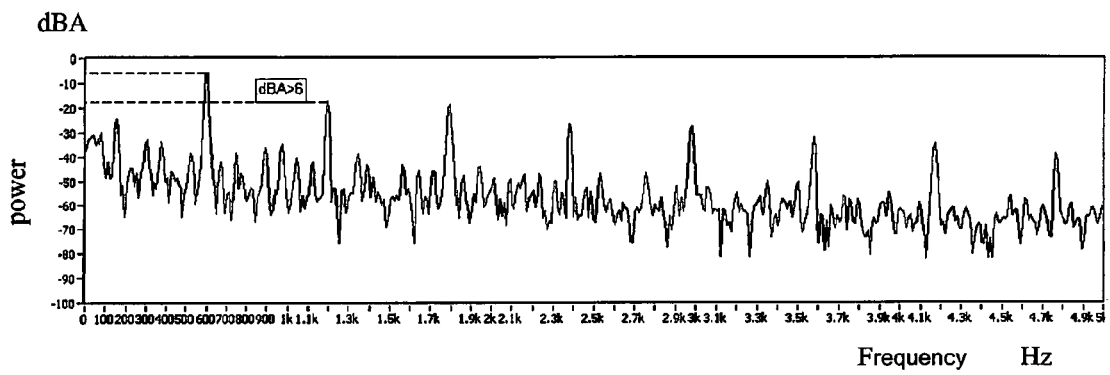
FIG. 9 shows a fast Fourier transform of a current waveform of an electric motor using brushes in accordance with one embodiment of the present invention.

FIG. 6 shows a current waveform of a conventional electric motor using brushes with flat contact surfaces. FIG. 7 shows a current waveform of an electric motor using brushes in accordance with one embodiment of the present invention. FIG. 8 shows a fast Fourier transform of the current waveform of the conventional electric motor of FIG. 6. FIG. 9 shows a fast Fourier transform of the current waveform of FIG. 7.

As shown in FIGS. 6 and 7, the V-shaped contact surface of the present invention is beneficial to reduce current fluctuation to thereby reduce sources of vibration and therefore reduce the noise of the motor. Furthermore, the V-shaped contact surface of the present invention is beneficial to increase the dBA difference between the fundamental wave and the harmonic wave due to reduced contact points between the V-shaped contact surface of the brush and commutator. Preferably, the dBA difference between the fundamental wave and the harmonic wave of the current wave of the electric motor in accordance with one embodiment of the present invention is greater than 6 dBA such that the controller of the motor is capable of determining the fundamental wave to thereby count rotations or calculate rotation speed of the electric motor without using a Hall sensor.

Figure 10:
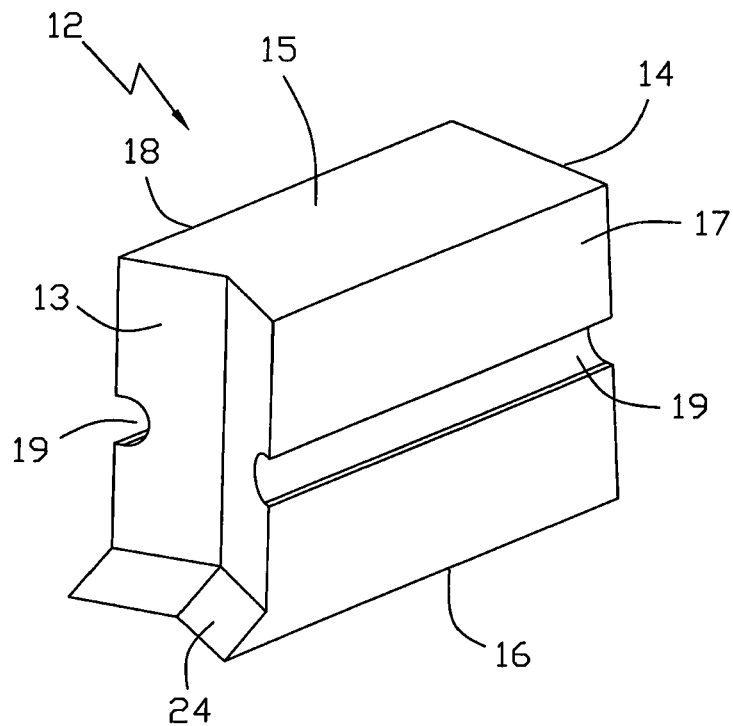
FIG. 10 is an isometric view of a brush in accordance with an alternate embodiment of the present invention.

An alternate brush is depicted in FIG. 10. This brush has a similar construction to the brush of FIG. 1 except that the contact surface 13 has a projection 24 forming an exaggerated tip which makes first contact with the commutator. Projection 24 is also V-shaped in keeping with the shape of the remainder of the contact surface 13. The projection 24 forms a part of the contact surface which makes an inclined angle with the commutator surface. This angle is much greater than the inclined angle of the remainder of the contact surface. In a preferred embodiment the angle formed by the projection 21 is about 60 degrees and the angle formed by the remainder of the contact surface is about 4 degrees. This sharp tip formed on the contact surface creates a very fast bedding in of the brush with the commutator which leads to excellent long term contact between the brush and the commutator. The projection 24 is a relatively small portion of the contact surface so that as the tip is rapidly worn away under initial running of the motor to bed the brush in, the remainder of the contact surface comes into contact with the commutator. As the remainder of the contact surface makes an angle with the commutator surface, the brush continues to bed in but at a slower rate as a greater portion of the contact surface comes into contact with the commutator, until the brush makes full contact with the surface of the commutator. Thus the projection 24 provides a rapid bedding in of the initial contact points of the brush with the surface of the commutator while providing two contact points with the commutator surface initially but the V-shaped configuration of the projection 24 which matches with the remainder of the contact surface. As the motor is used, the contact points wear and become contact regions which continue to enlarge until the brush is worn to such an extent that full contact is made between the brush and the commutator.

Figure 11:
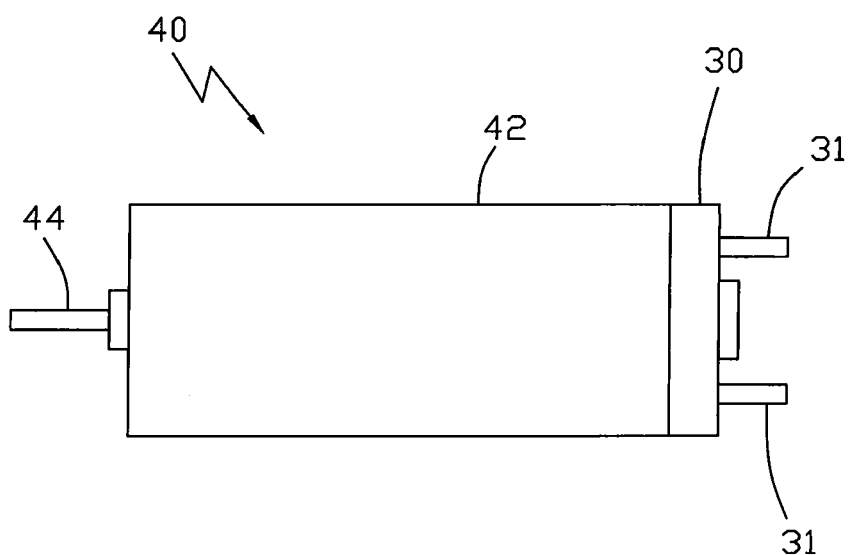
FIG. 11 shows an electric motor according to an embodiment of the present invention.

FIG. 11 illustrates a small size electric motor 40 to which this invention is applicable. The motor 40 is preferably a micro motor such as a permanent magnet direct current (PMDC) motor having a power rating of less than 1000 watts. The motor has a stator and a rotor. The stator has a housing 42 supporting one or more permanent magnets forming the poles of the stator and an end cap 30 closing an open end of the housing and supporting brush gear and motor terminals 31. The rotor comprises a shaft 44, a rotor core, a commutator and windings wound about the rotor core and terminated on the commutator. The rotor is rotatably supported by bearings of the stator. The brush gear has brushes as described hereinbefore which make sliding contact with the commutator to transfer electrical power from the motor terminals to the windings of the rotor.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A brush for making electrical contact with a commutator of an electric motor, the commutator having an insulating base, and a plurality of segments circumferentially spaced on an outer surface of the insulating base with a gap between adjacent segments, the brush comprising:

a first end surface;

a second end surface opposite to the first end surface; and a contact surface extending at least partially between the first and second end surfaces, configured to make sliding contact with a cylindrical circumferential surface of the commutator, and having a circumferential width smaller than total circumferential width of one said segment and one said gap of the commutator so that the contact surface makes contact with at most two adjacent segments of the commutator at any time;

wherein the extending direction of the contact surface is inclined relative to the axial direction of the commutator, the contact surface is V-shaped when viewed in the extending direction thereof, a middle portion of the contact surface is concaved relative to two opposite side portions of the contact surface; and the initial contact between the contact surface of the brush and the surface of the commutator are only two point contacts.

2. The brush of claim 1, wherein the extending direction of the contact surface is inclined relative to the axial direction of the commutator with an angle of 1~60 degree.

3. The brush of claim 2, where the inclined angle is between 3 and 10 degrees.

4. The brush of claim 1, wherein the brush has a pair of grooves formed in opposite surfaces thereof for guiding the brush to the commutator.

5. The brush of claim 1, wherein the two point contacts are separate and located at the two opposite side portions of the contact surface of the brush in the circumferential direction of the commutator.

6. An electric motor comprising:

a commutator having an insulating base and a plurality of segments circumferentially spaced on an outer surface of the base with a gap between adjacent segments; and a brush gear comprising at least two brushes for making slide contact with the commutator, comprising:

first and second end surfaces opposite to each other in an axial direction; and a contact surface extending at least partially between the first and second end surfaces and configured to make sliding contact with the commutator, an extending direction of the contact surface being inclined relative to the axial direction of the commutator, the contact surface being V-shaped when viewed in the axial direction, a middle portion of the contact surface being concaved relative to two opposite side portions of contact surface, the contact surface being configured to be in contact with at most two adjacent segments of the commutator at any time, the initial contact between the contact surface and the commutator being two point contacts.

7. The electric motor of claim 6, wherein the two point contacts are separate and located at the two opposite side portions of the contact surface of the brush in the circumferential direction of the commutator.

* * * * *